(No Model.)
R. C. LYON.
RUNNING GEAR FOR WAGONS.
No. 260,582. Patented July 4, 1882.
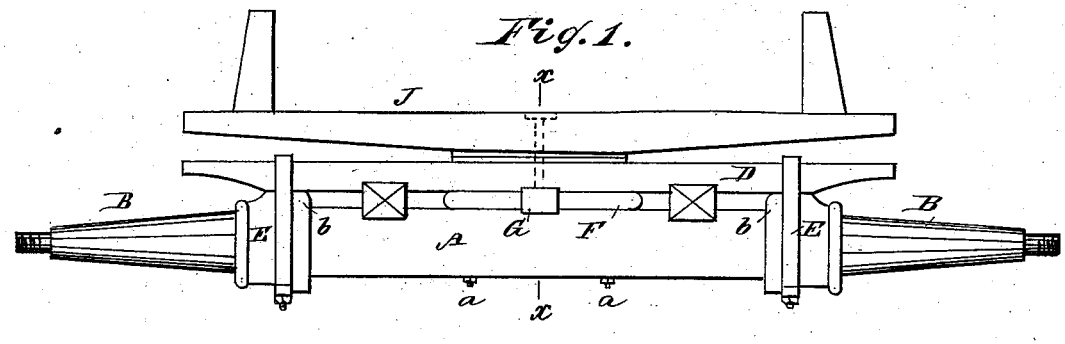
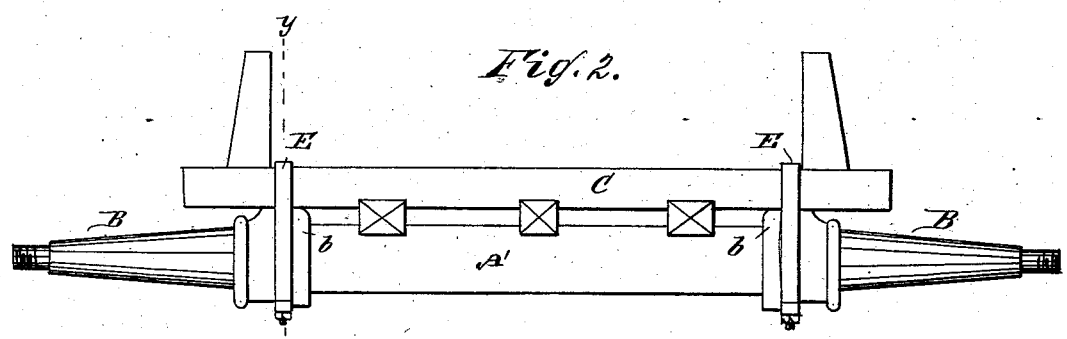
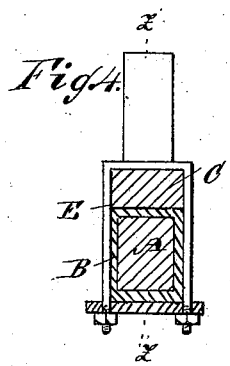
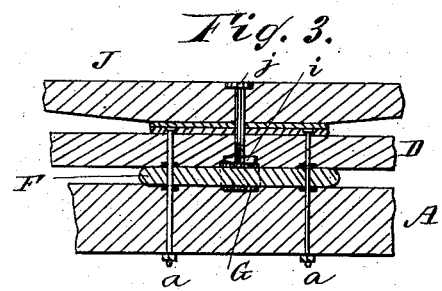
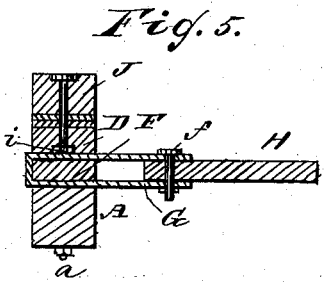
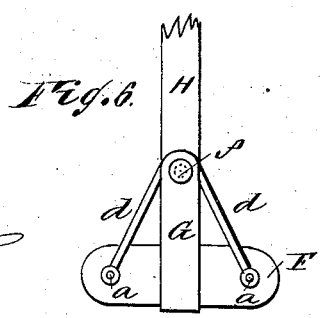
WITNESSES:
Theo. G. Hoster
C. Sedgwick
INVENTOR:
R. C. Lyon
BY Munn & Co.
ATTORNEYS.

UNITED STATES PATENT OFFICE.

REUBEN C. LYON, OF CENTRALIA, WISCONSIN.

RUNNING-GEAR FOR WAGONS.

SPECIFICATION forming part of Letters Patent No. 260,582, dated July 4, 1882.

Application filed April 21, 1882. (No model.)

*To all whom it may concern:*

Be it known that I, REUBEN C. LYON, of Centralia, in the county of Wood and State of Wisconsin, have invented a new and useful Improvement in Wagons, of which the following is a full, clear, and exact description.

This invention relates to an improvement in running-gears for vehicles, and has for its object to promote strength and durability without materially increasing the weight of the parts; and it consists in the construction of the reach-coupling for the front axle, substantially as hereinafter more fully set forth and claimed.

Reference is to be had to the accompanying drawings, forming a part of this specification, in which similar letters of reference indicate corresponding parts in all the figures.

Figure 1 is a rear elevation of the forward axle of a wagon made in accordance with my invention. Fig. 2 is a similar view of the rear axle built in accordance with my invention. Fig. 3 is a detailed sectional elevation on the line $z\ z$ of Fig. 4. Fig. 4 is a sectional elevation taken on the line $y\ y$ of Fig. 2. Fig. 5 is a sectional elevation taken on the line $x\ x$ of Fig. 1, and Fig. 6 is a plan view of the plate and holding-block for holding the reach.

A A' represent the axles, which are provided with the thimble-skeins B, which are formed with the raised portions $b$, which support the bolster C of the rear axle, A', and the sand-board D of the forward axle, A, as shown in Figs 1 and 2; and E E are the bands by which the bolster and sand-board are held to and upon the axle and upon said raised portions of the skeins.

Between the sand-board D and the forward axle, A, in the center, is placed the block F, which is held in place by the rods $a\ a$ passing through the sand-board, block, and axle. This block supports the sand-board in the center, and holds the U-shaped plate G, in which the reach H is held by the king-bolt $f$, as shown in Figs. 5 and 6. This U-shaped plate G is braced from the rods $a\ a$ by the brace-rods $d$ $d$, as shown in Fig. 6, which hold the plate firm against lateral movement. The forward bolster, J, is pivoted upon the sand-board D by means of the bolt $j$, which passes through the bolster and sand-board, and screws into the nut $i$, sunk its thickness into the under side of the sand-board, as shown clearly in Fig. 3.

Instead of forming the skeins with the enlargements $b$ for supporting the sand-board and bolster, enlargements may be formed upon the under side of the sand-board or bolster, near the ends thereof, and used with the ordinary form of skein; or other means might be devised for supporting the sand-board and bolster at the ends upon the axle and not depart from the spirit of my invention; but the plan shown is the preferred plan. By this means it will be seen the strength of the bolster and sand-board is combined with the strength of the axle, thus making the whole stronger without material increase of weight of these parts; and it will be seen that by means of the plate G the necessity for boring and thus weakening the forward axle for the passage of the king-bolt is avoided, and the sand-board is supported in the center by the block F, thus still further increasing the strength of the axle and sand-board.

Having thus described my invention, I claim as new and desire to secure by Letters Patent—

In a vehicle running-gear, the combination, with the block F, interposed between and fastened to the sand-board or bolster and the front axle, and the reach H, of the U-shaped plate G, embracing the block F and connected to the reach, and the stay-rods or braces $d\ d$, connected to the reach coupling-bolt $f$, and the rods $a$, securing the block F in position, substantially as and for the purpose set forth.

REUBEN C. LYON.

Witnesses:
N. J. BOUCHER,
S. PRESTON.